US012429757B2

(12) United States Patent
Ohsugi

(10) Patent No.: US 12,429,757 B2
(45) Date of Patent: Sep. 30, 2025

(54) LIGHT SOURCE APPARATUS AND PROJECTOR

(71) Applicant: CASIO COMPUTER CO., LTD., Tokyo (JP)

(72) Inventor: Naohiro Ohsugi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 481 days.

(21) Appl. No.: 18/082,110

(22) Filed: Dec. 15, 2022

(65) Prior Publication Data

US 2023/0194970 A1 Jun. 22, 2023

(30) Foreign Application Priority Data

Dec. 17, 2021 (JP) ................. 2021-205385

(51) Int. Cl.
*G03B 21/20* (2006.01)
*G02B 26/00* (2006.01)

(52) U.S. Cl.
CPC ....... *G03B 21/2066* (2013.01); *G02B 26/008* (2013.01); *G03B 21/2013* (2013.01)

(58) Field of Classification Search
CPC ............ G03B 21/2066; G03B 21/2013; G03B 21/00; G03B 21/14; G03B 21/20; G03B 21/204; G03B 33/08; G03B 21/16; G03B 21/206; G02B 26/008
USPC .......................................................... 353/85
See application file for complete search history.

(56) References Cited

U.S. PATENT DOCUMENTS

| 10,073,333 | B2 * | 9/2018 | Nishimori | G03B 33/08 |
| 2008/0239248 | A1 * | 10/2008 | Mihara | G03B 33/08 |
| | | | | 353/85 |
| 2015/0036332 | A1 * | 2/2015 | Wang | H04N 9/3158 |
| | | | | 362/231 |
| 2020/0201154 | A1 * | 6/2020 | Sugiyama | G03B 21/204 |
| 2020/0326614 | A1 * | 10/2020 | Takashimada | H04N 9/3155 |
| 2020/0326617 | A1 * | 10/2020 | Oda | G03B 21/204 |
| 2020/0326618 | A1 * | 10/2020 | Narikawa | G03B 21/204 |

FOREIGN PATENT DOCUMENTS

| JP | 2019-184796 A | 10/2019 |
| JP | 2021-139975 A | 9/2021 |

\* cited by examiner

*Primary Examiner* — Magda Cruz
(74) *Attorney, Agent, or Firm* — Fitch, Even, Tabin & Flannery LLP

(57) ABSTRACT

A light source apparatus includes a rotational wheel device having a rotational wheel including a reflection area configured to reflect light in the blue wavelength range, and a transmission area configured to transmit at least light in the red wavelength range and light in the green wavelength range and a dichroic mirror configured to transmit light in the blue wavelength range and light in the red wavelength range and reflect light in the green wavelength range, and the dichroic mirror includes an intersecting portion which intersects apart of the rotational wheel in an overlapping manner and on which light in the blue wavelength range, light in the red wavelength range, and light in the green wavelength range are shined.

19 Claims, 9 Drawing Sheets

LIGHT SOURCE APPARATUS AND PROJECTOR

CROSS-REFERENCE TO RELATED APPLICATION

This patent application is based upon and claims the benefit of priority under 35 USC 119 from Japanese Patent Application No. 2021-205385 filed on Dec. 17, 2021, the entire disclosure of which, including the specification, claims, drawings and abstract, is incorporated herein by reference in its entirety.

BACKGROUND OF THE INVENTION

Field of the Invention

The present invention relates to a light source apparatus and a projector.

Description of the Related Art

In these days, projectors are in use which project, for example, a screen of a personal computer, a video screen, image data stored in a memory card or the like on to a screen. In these projectors, light emitted from a light source is collected to a micromirror display device called a digital micromirror device (DMD) or a liquid crystal panel to thereby display a color image on the screen.

For example, Japanese Patent Laid-Open No. 2021-139975 (JP-A-2021-139975) discloses a light source apparatus including a light source for emitting light having a wavelength in the blue wavelength range or simply light in the blue wavelength range (light in a first wavelength range), a light source for emitting light having a wavelength in the red wavelength range or simply light in the red wavelength range (light in a second wavelength range), a dichroic mirror, and a luminescent wheel for emitting light having a wavelength in the green wavelength range or simply light in the green wavelength range (light in a third wavelength range) as luminescent light. Light in the blue wavelength range is transmitted through the dichroic mirror and the luminescent wheel so as to be guided towards a display device. Light in the red wavelength range is transmitted through the dichroic mirror so as to be guided towards the display device. In addition light in the green wavelength range, which is emitted from the luminescent wheel, is reflected on the dichroic mirror so as to be guided towards the display device.

However, in the light source apparatus disclosed in JP-A-2021-139975 described above, the path of light in the blue wavelength range differs from the paths of light in the red wavelength range and light in the green wavelength range, and hence, a lens member or the like for guiding light in the blue wavelength range needs to be disposed separately, which may result in a case in which the utilization efficiency of an inside space of the light source apparatus is deteriorated. Additionally, there may be caused problems in that the cost of constituent members is increased or the assembling precision of the constituent members is required more due to an increase in the number of constituent members as a result of the lens member for guiding light in the blue wavelength range being provided separately.

SUMMARY OF THE INVENTION

To solve the problems described above, according to an aspect of the present disclosure, there is provided a light source apparatus including a rotational wheel device having a rotational wheel including a reflection area configured to reflect light in a first wavelength range, and a transmission area configured to transmit at least light in a second wavelength range and light in a third wavelength range, and a mirror configured to transmit light in the first wavelength range and light in the second wavelength range and reflect light in the third wavelength range, wherein the mirror includes an intersecting portion which intersects a part of the rotational wheel in an overlapping manner and on which light in the first wavelength range, light in the second wavelength range, and light in the third wavelength range are shined.

According to another aspect of the present disclosure, there is provided a projector including the light source apparatus described above, a display device configured to generate image light, a projection optical system configured to project the image light emitted from the display device on to a projection target object, and a processor configured to control the light source apparatus and the display device.

DESCRIPTION OF THE EMBODIMENT

First Embodiment

Figure 1:
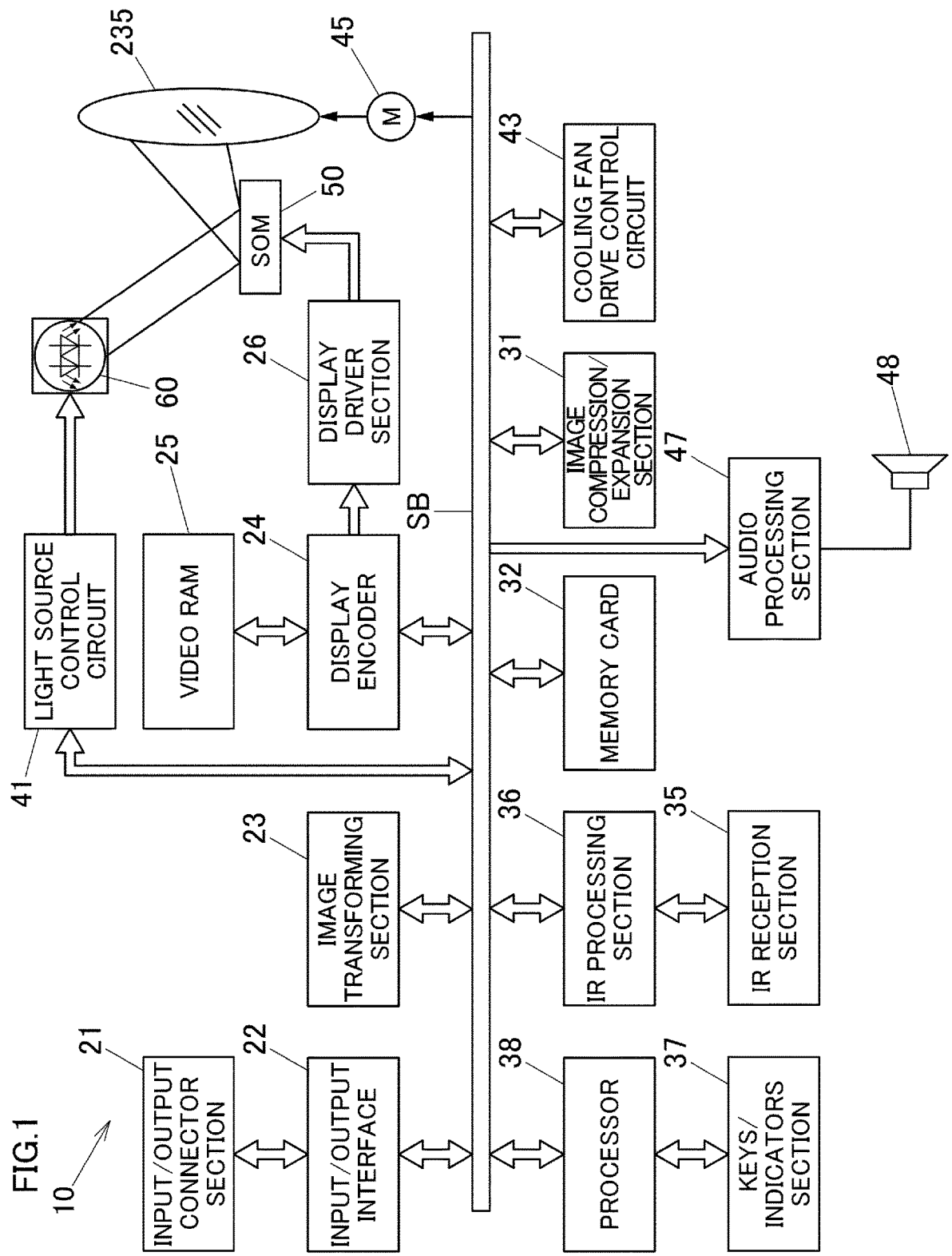
FIG. 1 is a diagram showing functional circuitry blocks of a projector according to a first embodiment.

Hereinafter, referring to FIGS. 1 to 7, a first embodiment of the present disclosure will be described. FIG. 1 is a block diagram showing functional circuitry blocks of a projector 10. A projector control unit is made up of a central processing unit (CPU) including an image transforming section 23 and a processor 38, a front-end unit including an input/output interface 22, a display encoder 24, a display drive section 26, and the like. Image signals of various standards which are input from an input/output connector section 21 are sent to the image transforming section 23 via the input/output interface 22 and a system bus SB, and the image signals so sent are then transformed so as to be unified into an image signal of a predetermined format which is suitable for display in the image transforming section 23. Thereafter, the unified image signal of the predetermined format is output to the display encoder 24.

The display encoder 24 deploys the image signal input thereinto on a video RAM 25 for storage therein and then generates a video signal from the stored contents of the video RAM 25, outputting the video signal so generated to the display drive section 26.

The display drive section 26 drives a display device 50, which is a spatial optical modulator (SOM), at an appropriate frame rate in response to the image signal output from the display encoder 24. In one embodiment, the display device 50 is a digital micromirror device (DMD). The projector 10 is such that light emitted from a light source apparatus 60 is shined on to the display device 50 via a light guiding optical system, whereby an optical image is formed by the light reflected by the display device 50, and the optical image so formed is then projected via a projection optical system 220 (refer to FIG. 2) on to a projection target object such as a screen, not shown, to be displayed on the screen. A movable lens group 235 of the projection optical system 220 can be driven using a lens motor 45 for zooming and focusing.

An image compression/expansion section 31 performs a recording process in which a luminance signal and a color difference signal of the image signal are data compressed through processing such as Adaptive Discrete Cosine Transform (ADCT), Huffman coding, and the like, and the compressed data is then sequentially written on a memory card 32, which is a detachable recording medium. Further, with the projector 10 set in a reproducing mode, the image compression/expansion section 31 reads out the image data recorded in the memory card 32 and expands the individual image data that makes up a series of dynamic images frame by frame, outputting the image data so expanded to the display encoder 24 by way of the image transforming section 23. As a result, the image compression/expansion section 31 can output the dynamic images or the like based on the image data stored in the memory card 32.

The processor 38 governs the control of operations of individual circuitries inside the projector 10 and is made up of CPU, a read only memory (ROM) for fixedly storing operation programs such as various settings or the like, RAM used as a work memory, and the like.

A keys/indicators section 37 is made up of main keys and indicators which are provided on a housing of the projector 10. Operation signals of the keys/indicators section 37 are sent out directly to the processor 38. Key operation signals from a remote controller are received by an Ir reception section 35 and are demodulated into code signals in an Ir processing section 36, which are then output to the processor 38.

The processor 38 is connected with an audio processing section 47 by way of the system bus SB. This audio processing section 47 includes a circuitry for a sound source such as a PCM sound source or the like. With the projector 10 set in a projection mode and the reproducing mode, the audio processing section 47 converts audio data into analog signals and drives a speaker 48 so as to output sound or voice loudly therefrom.

The processor 38 controls a light source control circuit 41. The light source control circuit 41 controls separately operations of an excitation light shining device 70, a red light source device 80, a luminescent wheel device 100, and a rotational wheel device 150 (refer to FIG. 2) of the light source apparatus 60 so as to enable the light source apparatus 60 to emit lights in predetermined wavelength ranges which are required in generating an image.

Further, the processor 38 causes a cooling fan drive control circuit 43 to detect temperatures using multiple temperature sensors provided in the light source apparatus 60 and the like, so that the rotation speed of a cooling fan is controlled based on the results of the temperature detections. Additionally, the processor 38 causes the cooling fan drive control circuit 43 to keep the cooling fan rotating using a timer or the like even after a power supply to a main body of the projector 10 is switched off or causes the cooling fan control circuit 43 to switch off the power supply to the main body of the projector 10 depending on the results of the temperature detections by the temperature sensors.

Figure 2:
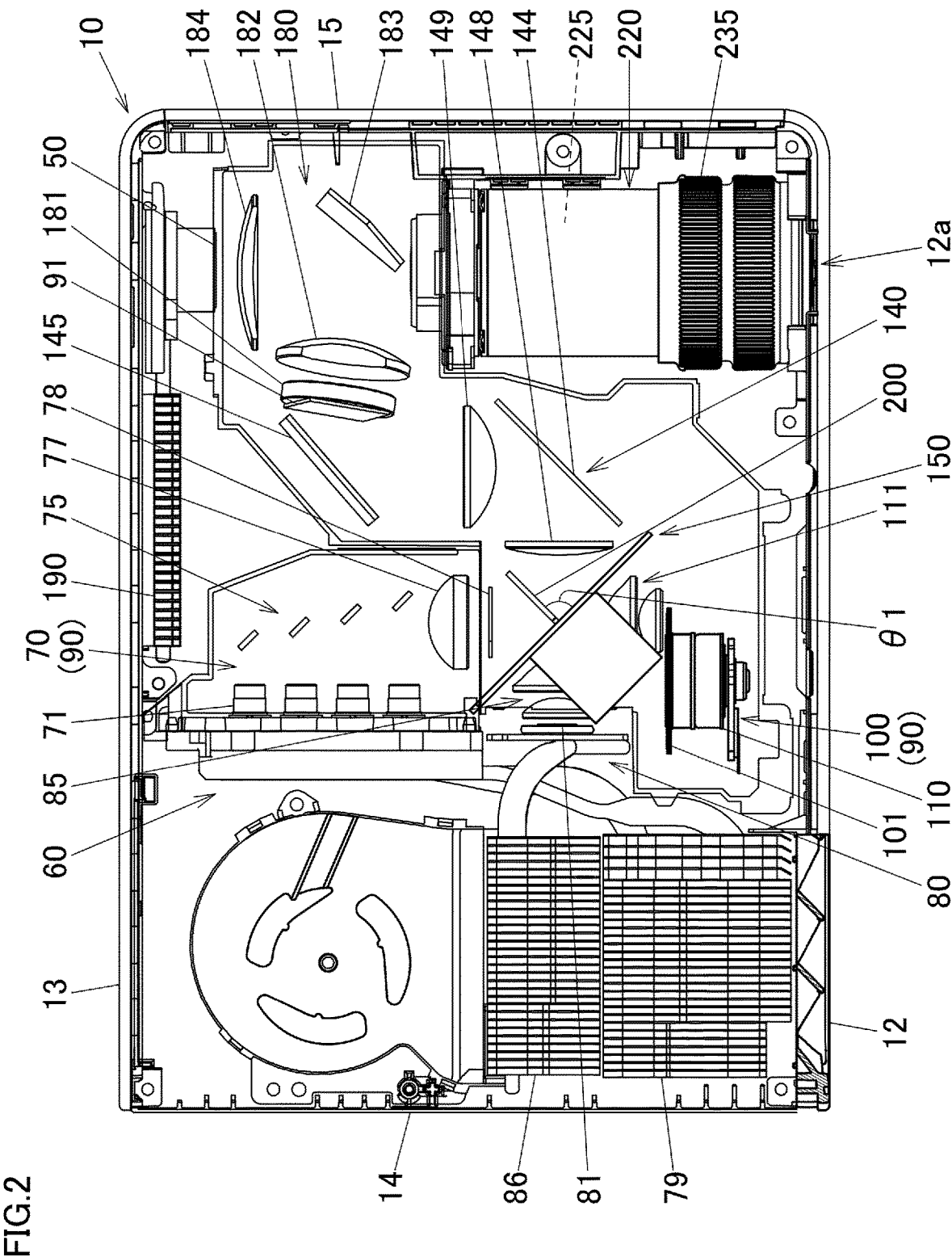
FIG. 2 is a schematic plan view showing an internal structure of the projector according to the first embodiment.

Next, an internal structure of the projector 10 will be described. FIG. 2 is a schematic plan view showing an internal structure of the projector 10. Here, this projector 10 has a substantially box-shaped housing, which includes an upper panel and a bottom panel, which are not shown, a front panel 12, a back panel 13, a right panel 14, and a left panel 15. In addition, the projector 10 has a projection port 12a on a front side thereof. In the following description, when a left-right direction is referred to in relation to the projector 10, it denotes a left-right direction with respect to a projecting direction from the projection port 12a, whereas when a front-rear direction is referred to in relation to the projector 10, it denotes a front-rear direction with respect to a direction from the projector 10 towards the projection target object and a traveling direction of light from the projector 10.

The projector 10 includes the light source apparatus 60 at a substantially central portion in an inside space of the projector 10. A light guiding optical system 180 and the projection optical system 220 are disposed between the light source apparatus 60 and the left panel 15. Heat sinks 79, 86 and the like are disposed between the light source apparatus 60 and the right panel 14.

The light source apparatus 60 includes the excitation light shining device (a first wavelength range light shining device) 70, which constitutes not only a light source of light having a wavelength in the blue wavelength range or simply light in the blue wavelength range (light in a first wavelength range) but also a light source of excitation light, the red light source device (a second wavelength range light shining device) 80, which constitutes a light source of light having a wavelength in the red wavelength range or simply light in the red wavelength range (light in a second wavelength range), and a green light source device 90, which constitutes a light source of light having a wavelength in the green wavelength range or simply light in the green wavelength range (light in a third wavelength range). The green light source device 90 is made up of the excitation light shining device 70 and the luminescent wheel device (luminescent light emitting device) 100. In addition, a light guiding optical system 140, which is configured to guide light in the blue wavelength range, light in the red wavelength range, and light in the green wavelength range, is disposed in the light source apparatus 60.

The light source optical system 140 has the luminescent wheel device 100, the rotational wheel device 150, and a dichroic mirror (a mirror member) 200. Additionally, the light source optical system 140 has a first reflection mirror 144, a second reflection mirror 145, a first collective lens 148, and a second collective lens 149. The first reflection mirror 144 and the second reflection mirror 145 reflect individually light in the blue wavelength range, light in the red wavelength range, and light in the green wavelength range. The light source optical system 140 collects lights emitted from the various light source devices (the excitation light shining device 70, the red light source device 80, and the green light source device 90) on to an incident surface of a microlens array 91, which will be described later.

The excitation light shining device 70 is disposed in a position which is situated at a substantially central portion of the housing of the projector 10 in the left-right direction and closer to the back panel 13. The excitation light shining device 70 has a light source group of blue laser diodes (a first light source) 71, a reflection mirror group (a reflection member) 75, an excitation light path side collective lens 77, and a diffusing plate 78. The light source group is formed of multiple blue laser diodes 71, which are semiconductor light emitting elements, disposed in such a manner that optical axes thereof become parallel to the back panel 13. The blue laser diodes 71 making up the light source group are arranged into a matrix configuration of two rows and four columns. The excitation light shining device 70 is connected with the heat sink 79 by way of a heat pipe so as to be cooled by the heat sink 79.

The reflection mirror group 75 has multiple reflection mirrors which are arranged into a ladder-like configuration, and the blue laser diodes 71 emit lights in such a manner that an effective diameter of light to be emitted is narrowed in one direction. The reflection mirror group 75 changes directions of axes of lights emitted from the individual blue laser diodes 71 through 90 degrees towards the front panel 12. As a result, lights emitted from the blue laser diodes 71 are reflected towards the excitation light path side collective lens 77 by the reflection mirror group 75.

In this first embodiment, although the configuration is described in which the reflection mirrors of the reflection mirror group 75 are disposed so as to be situated on optical axes of the corresponding blue laser diodes 71, collimator lenses or optical fibers may be disposed on the optical axes of the blue laser diodes 71. In the case that optical fibers are disposed, the excitation light shining device 70 includes further optical fibers, and incident portions of the optical fibers are disposed on the optical axes of the blue laser diodes 71, whereas emerging portions of the optical fibers are disposed so as to face the excitation light path side collective lens 77. In the case that the optical fibers are used, the arrangement of the blue laser diodes 71 is not limited to the positions shown in FIG. 2. In a certain embodiment, the blue laser diodes 71 may be disposed outside the housing of the projector 10. In addition, in this first embodiment, although the configuration is described in which the multiple blue laser diodes 71 are arranged, a configuration may be adopted in which one blue laser diode 71 is disposed so as to constitute a light source of excitation light. Additionally, the excitation light source is not limited to the blue laser diodes, and hence, any light source can be adopted as long as it emits light in the first wavelength range. In a certain embodiment, a blue light emitting diode (LED) may be used as the excitation light source.

The red light source device 80 has a red light emitting diode (a second light source) 81, which is disposed in such a manner that an optical axis thereof becomes parallel to those of the blue laser diodes 71, and a red side collective lens group 85 for collecting light emitted from the red light emitting diode 81. The red side collective lens group 85 is made up of two collective lenses which have different sizes. The red light emitting diode 81 is a semiconductor light emitting element for emitting light in the red wavelength range. In addition, the red light source device 80 is disposed in such a manner that an axis of light in the red wavelength range emitted from the red light source 80 intersects an axis of light in the blue wavelength range emitted from the excitation light shining device 70 and an axis of light in the green wavelength range emitted from a luminescent wheel 101. The red light source device 80 is connected with the heat sink 86 by way of a heat pipe so as to be cooled by the heat sink 86. In a certain embodiment, an optical fiber may be disposed on an optical axis of the red light emitting diode 81. In the case that an optical fiber is disposed, the red light source device 80 includes further an optical fiber, and an incident portion of the optical fiber is disposed on the optical axis of the red light emitting diode 81, while an emerging portion of the optical fiber is disposed so as to face the red side collective lens group 85.

The luminescent wheel device 100, which makes up the green light source device 90, is disposed on a light path of light in the blue wavelength range emitted from the excitation light shining device 70 and in the vicinity of the front panel 12. The luminescent wheel device 100 has the luminescent wheel 101, which is disposed in such a manner as to become parallel to the front panel 12 (in other words, in such a manner as to intersect an axis of light emitted from the excitation light shining device 70 at right angles), a motor 110 for rotationally driving the luminescent wheel 101, and a drive control device, not shown, for controlling the drive of the motor 110. The drive control device is controlled by the light source control circuit 41 described above. A luminescence side collective lens group 111 is disposed on a side of the luminescent wheel device 100 which faces the back panel 13. This luminescence side collective lens group 111 collects excitation light emitted from the excitation light shining device 70 on to the luminescent wheel 101 and collects light in the green wavelength range emitted from the luminescent wheel 101 in the direction of the back panel 13. The luminescence side collective lens group 111 is made up of two collective lenses having different sizes.

Figure 3A:
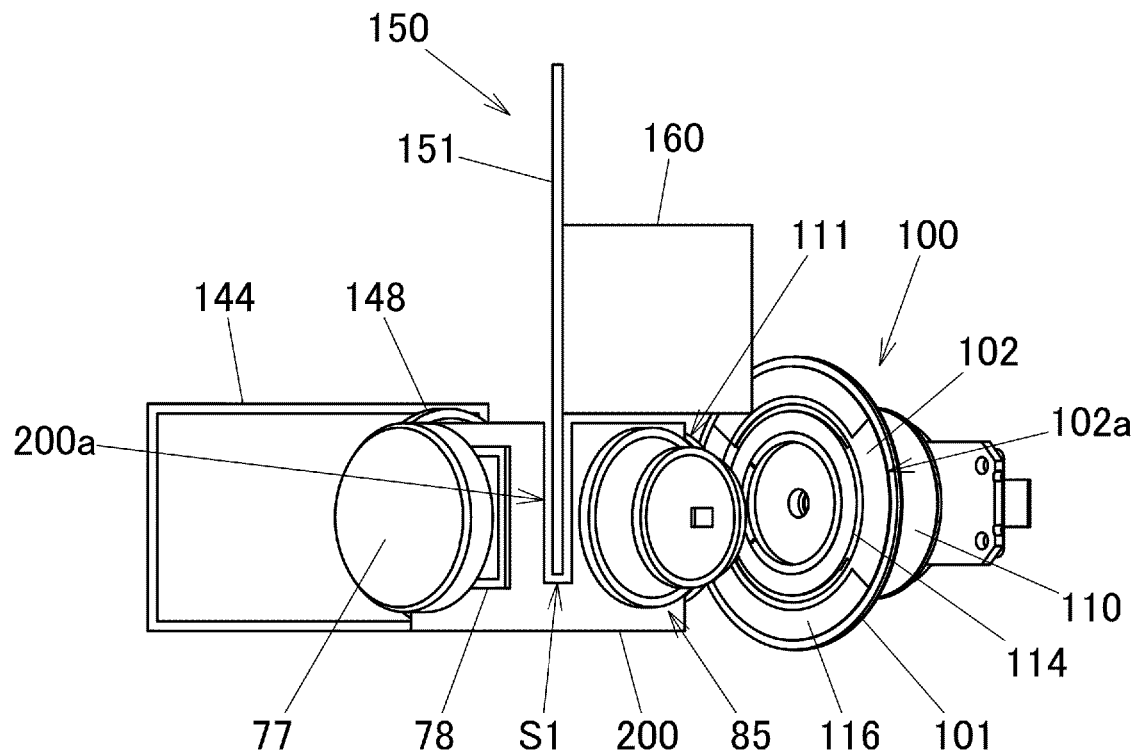
FIG. 3A is a front view showing an arrangement of members in the vicinity of a dichroic mirror in the first embodiment.
Figure 3B:
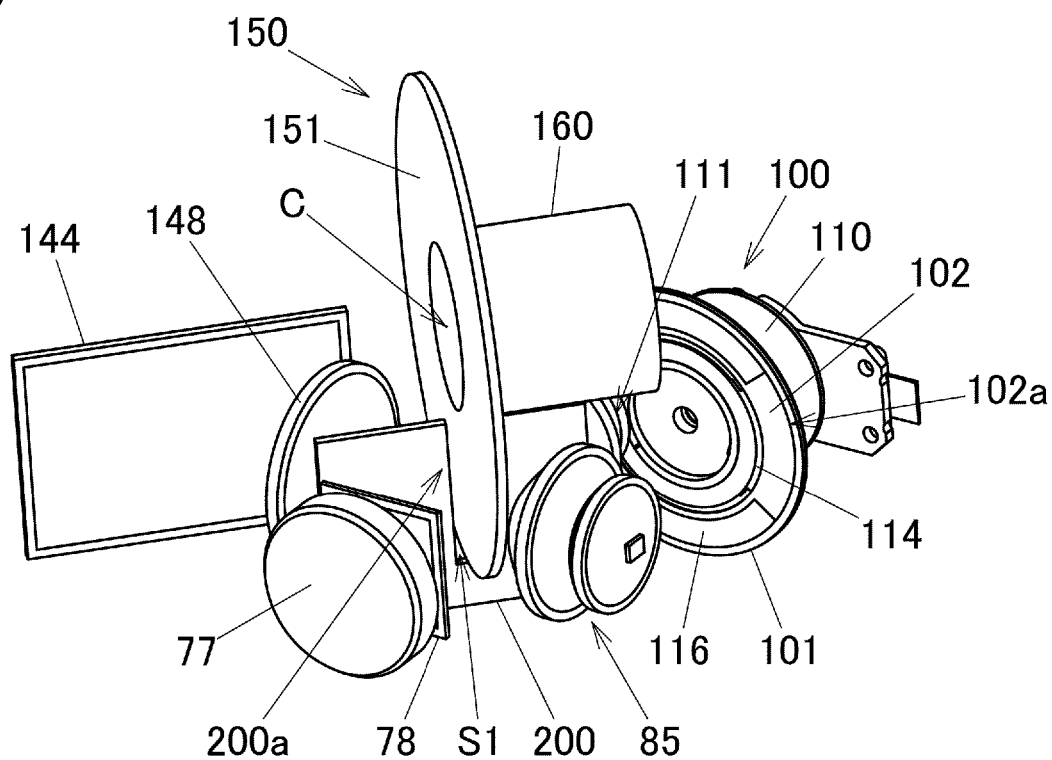
FIG. 3B is a perspective view showing the arrangement of members in the vicinity of the dichroic mirror in the first embodiment.

The luminescent wheel 101 shown in FIGS. 3A and 3B has a circular disk-like shape or an annular shape, and a radially inner side of the luminescent wheel 101 which defines a luminescent wheel opening portion 114 is connected to a shaft portion of the motor 110 so that the luminescent wheel 101 can be driven to rotate by the motor 110. A base 102 of the luminescent wheel 101 can be formed of a metal such as copper, aluminum, of the like. A surface 102a of the base 102 which faces the excitation light shining device 70 is mirror finished through silver deposition or the like. A green luminescent material layer is provided on a mirror finished surface of a substantially C-shaped luminescent light emitting area 116. The luminescent light emitting area 116 receives light in the blue wavelength range emitted from the excitation light shining device 70 as excitation light to thereby emit luminescent light in the green wavelength range (light in the green wavelength range) in every direction.

Luminescent light emitted from the luminescent light emitting area 116 is emitted from the luminescent wheel device 100 and is then incident on the luminescence side collective lens group 111 which is disposed on the side of the luminescent wheel device 100 which faces the rotational wheel device 150 and the dichroic mirror 200. A collection diameter of the light in the green wavelength range which is incident on the luminescence side collective lens group 111 is narrowed by the luminescence side collective lens group 111, so that the light in the green wavelength range so narrowed emerges from the luminescence side collective lens group 111 to travel towards the rotational wheel device 150 and the dichroic mirror 200.

The rotational wheel device 150 and the dichroic mirror 200 are disposed in a position where light in the blue wavelength range emitted from the excitation light shining device 70, light in the green wavelength range emitted from the luminescent wheel device 100, and light in the red wavelength range emitted from the red light source device 80 intersect each other. Specifically speaking, the rotational wheel device 150 and the dichroic mirror 200 are disposed at the intersecting position in such a manner as to overlap each other in an up-down direction. In addition, the rotational wheel device 150 is disposed in such a manner that apart of the rotational wheel device 150 overlaps the dichroic mirror 200 in the direction of the axis of light in the blue wavelength range emitted from the excitation light shining device 70, the direction of the axis of light in the green wavelength range emitted from the luminescent wheel device 100, and the direction of the axis of light in the red wavelength range emitted from the red light source device 80 (refer to FIGS. 3A and 3B).

Here, the configurations of the rotational wheel device 150 and the dichroic mirror 200 will be described. The rotational wheel device 150 has a rotational wheel 151 having a circular disk-like shape, a motor 160 for driving this rotational wheel 151, and a drive control device, not shown, for controlling the drive of the motor 160. The rotational wheel 151 is disposed at such an angle that light in the blue wavelength range emitted from the excitation light shining device 70, light in the red wavelength range emitted from the red light source device 80, and light in the green wavelength range emitted from the luminescent light emitting area 116 are incident obliquely on a plate surface (a front surface) of the rotational wheel 151. Specifically speaking, the rotational wheel device 150 is disposed inclined with respect to an axis of light in the blue wavelength range, an axis of light in the red wavelength range, and an axis of light in the green wavelength range which are shined on the rotational wheel 151 in such a manner that an angle of 45 degrees is formed individually between the axis of each of the lights in the blue, red, and green wavelength ranges and the plate surface of the rotational wheel 151 (refer to α1 to α3 shown in FIGS. 5 to 7).

Figure 4:
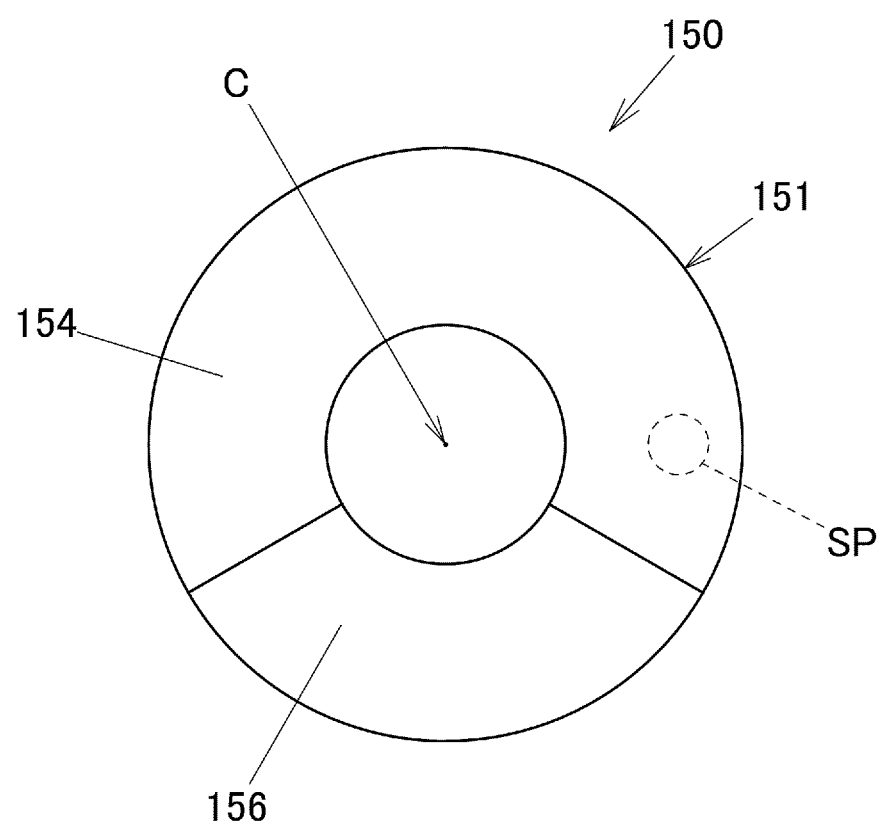
FIG. 4 is a schematic plan view of a rotational wheel device of the first embodiment.

As shown in FIG. 4, the rotational wheel 151 is a color wheel which is formed of a transparent material such as glass or resin having a light transmission characteristic and which has a transmission area 154 and a reflection area 156. The transmission area 154 is configured to transmit light. As a result, the transmission area 154 transmits light in the red wavelength range emitted from the red light source device 80 and light in the green wavelength range emitted from the luminescent light emitting area 116 of the luminescent wheel device 100. The reflection area 156 is mirror-processed, reflects light in the blue wavelength range emitted from the excitation light shining device 70, and transmits light in the red wavelength range and light in the green wavelength range. The reflection area 156 may be finished into a dichroic mirror. The transmission area 154 and the reflection area 156 are provided end to end in a circumferential direction of the rotational wheel 151, and in an example shown in FIG. 4, the transmission area 154 is disposed so as to extend into an angular range of substantially 240 degrees, and the reflection area 156 is disposed so as to extend into an angular range of substantially 120 degrees. Here, a ratio of occupation of the plate surface of the rotational wheel 151 by the transmission area 154 and the reflection area 156 is not limited to the angular ranges described above, and hence, the ratio of occupation may be changed as required.

The dichroic mirror 200 is a mirror member having a horizontally elongated rectangular plate-like shape and is configured so as to transmit light in the blue wavelength range and light in the red wavelength range and to reflect light in the green wavelength range in this first embodiment. The dichroic mirror 200 is disposed inclined with respect to an axis of light in the blue wavelength range, an axis of light in the red wavelength range, and an axis of light in the green wavelength range which are shined on the dichroic mirror 200 in such a manner that an angle of 45 degrees is formed individually between the axis of each of the lights in the blue, red, and green wavelength ranges and a mirror surface of the dichroic mirror 200 (refer to β1 to β3 shown in FIGS. 5 to 7). As a result, the direction of an axis of light in the green wavelength range emitted from the luminescent light emitting area 116 of the luminescent wheel device 100 is changed through 90 degrees towards the first collective lens 148 by the dichroic mirror 200.

Next, a form of disposition of the rotational wheel device 150 and the dichroic mirror 200 will be described. As shown in FIGS. 3A and 3B, the rotational wheel device 150 is disposed in such a manner as to overlap the dichroic mirror 200 in the up-down direction above the dichroic mirror 200. A thin slit S1 having a vertically elongated rectangular shape is provided at a substantially central portion of the mirror surface of the dichroic mirror 200 in a lateral or transverse direction thereof (a left-right direction in FIG. 3A) in such a manner as to open upwards. The rotational wheel device 150 is disposed such that a part of the rotational wheel 151 fits in the slit S1 and that the motor 160 is disposed close to the dichroic mirror 200 above the dichroic mirror 200.

As a result of the part of the rotational wheel 151 fitting in the slit S1 in the dichroic mirror 200 in the way described above, the dichroic mirror 200 intersects the rotational wheel 151 in such a manner that a part of the dichroic mirror 200 overlaps the part of the rotational wheel 151 (hereinafter, the relevant intersecting portion is referred to as an "intersecting portion 200a"). That is, the rotational wheel device 150 is disposed in such a manner that the part of the rotational wheel 151 and the dichroic mirror 200 overlap each other in a horizontal direction of the projector 10 at the intersecting portion 200a. In addition, the rotational wheel device 150 is disposed in such a manner that a center C of a rotational shaft (refer to FIGS. 3B, 4) of the rotational wheel 151 and slit S1 overlap each other in the up-down direction of the projector 10. Here, when referred to in the present specification, the intersecting portion 200a includes the slit S1, and a portion of the rotational wheel 151 and a portion of the dichroic mirror 200 which are situated in the vicinity of the slit S1.

In addition, the rotational wheel device 150 and the dichroic mirror 200 are disposed in such a manner that the plate surface of the rotational wheel 151 and the mirror surface of the dichroic mirror 200 intersect each other at right angles at the intersecting portion 200a. That is, an angle θ1 (refer to FIG. 2) formed by the plate surface of the rotational wheel 151 and the mirror surface of the dichroic mirror 200 is 90 degrees. Here, the slid S1 is given a gap which is slightly larger than a thickness of the rotational wheel 151 so that the part of the rotational wheel 151 and the dichroic mirror 200 are disposed close to each other at the intersecting portion 200a. The first reflection mirror 144 is disposed across the first collective lens 148 on sides of the rotational wheel device 150 and the dichroic mirror 200 which face the right panel 14 (refer to FIG. 2).

The dichroic mirror 200, the diffusing plate 78, the red side collective lens group 85, the luminescence side collective lens group 111, and the first collective lens 148 are each disposed in such a manner that their vertical positions are substantially the same in the up-down direction. The intersecting portion 200a of the dichroic mirror 200 faces each of the diffusing plate 78, the red side collective lens group 85, the luminescence side collective lens group 111, and the first collective lens 148. As a result, light in the blue wavelength range emitted from the excitation light shining device 70, light in the red wavelength range emitted from the red light source device 80, and light in the green wavelength range emitted from the luminescent wheel device 100 are made to be shined on the intersecting portion 200a. Then, light in the blue wavelength range, light in the red wavelength range, and light in the green wavelength range which emerge from the intersecting portion 200a of the dichroic mirror 200 are incident on the first collective lens 148.

In the following description, of plate surfaces of the rotational wheel 151, a plate surface facing the diffusing plate 78 and the first collective lens 148 will be described as a front plate surface (a plate surface on an opposite side will be described as a rear plate surface) of the rotational wheel 151, and of mirror surfaces of the dichroic mirror 200, a mirror surface facing the diffusing plate 78 and the red side collective lens group 85 will be described as a front mirror surface (a mirror surface on an opposite side will be described as a rear mirror surface) of the dichroic mirror 200.

Returning to FIG. 2, the second collective lens 149 is a convex lens (a positive meniscus lens) having a convex surface on an incident side and a concave surface on an emerging side of the lens. The second collective lens 149 collects light in the blue wavelength range, light in the red wavelength range, and light in the green wavelength range which are incident thereon from a side facing the first reflection mirror 144 and emits them towards the second reflection mirror 145. Directions of axes of those lights emitted from the second collective lens 149 are changed so as to be directed towards the microlens array 91 by the second reflection mirror 145 and are then guided towards the microlens array 91.

The light guiding optical system 180 has a concave lens 181, a convex lens 182, a third reflection mirror 183, and a condenser lens 184. Here, the condenser lens 184 emits image light, which is emitted from the display device 50 disposed on a side of the condenser lens 184 which faces the back panel 13, towards the projection optical system 220, and hence, the condenser lens 184 is also regarded as a part of the projection optical system 220. The concave lens 181 is disposed between the microlens array 91 and the convex lens 182 (in other words, a light path between the microlens array 91 and the display device 50). In addition, the convex lens 182 is disposed between the concave lens 181 and the third reflection mirror 183 (in other words, the light path between the microlens array 91 and the display device 50). In this first embodiment, while the example is illustrated in which the microlens array 91 is disposed at the portion of the light guiding system 180, a light tunnel or a light guiding rod may be disposed in place of the microlens array 91.

The projection optical system 220 is made up of the condenser lens 184, the movable lens group 235, and a fixed lens group 225. The fixed lens group 225, which is disposed on an optical axis of the condenser lens 184 which is situated on a side of the condenser lens 184 which faces the front panel 12, is incorporated within a fixed lens barrel and is moved manually or automatically for zooming and focusing.

With the projector 10 which is configured as has been described heretofore, the processor 38 controls the blue laser diodes 71, the red light emitting diode 81, and the rotational wheel device 150, whereby an emission period of light in the blue wavelength range is controlled so that the reflection area 156 of the rotational wheel 151 is positioned at the intersecting portion 200a, and an emission period of light in the red wavelength range and a luminescence period of light in the green wavelength range are controlled so that the transmission area 154 of the rotational wheel 151 is positioned at the intersecting portion 200a. As a result, lights in the blue, red, and green wavelength ranges are incident on the display device 50 by way of the light guiding optical system 180, and the display device 50 displays the blue, red, and green lights using the time-division technique in accordance with data, thereby making it possible to project a color image on to a screen.

Figure 5:
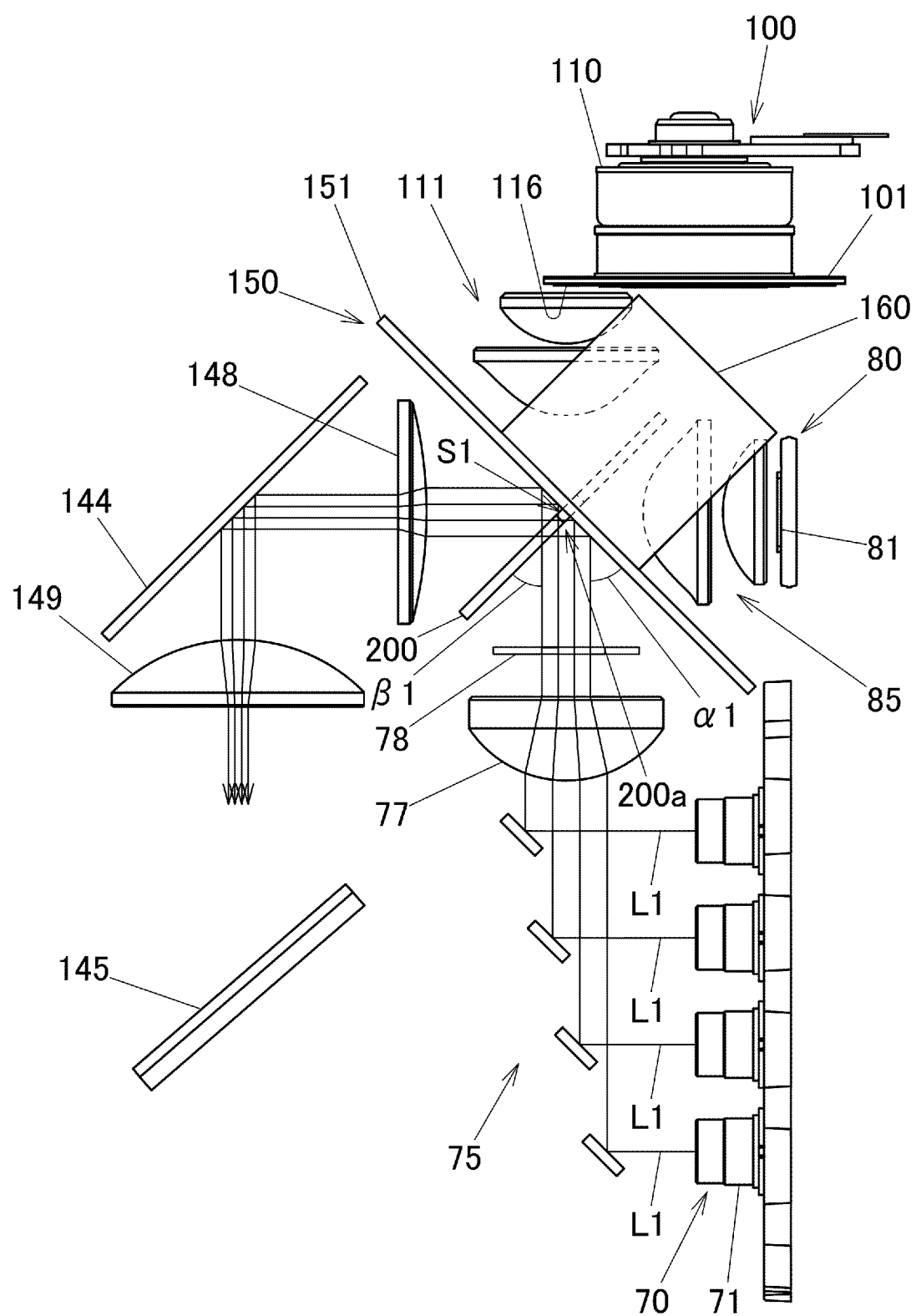
FIG. 5 is a schematic plan view showing how excitation light which is shined on the rotational wheel device and the dichroic mirror is reflected on the rotational wheel device in the first embodiment.

Next, how light enters and emerges from the rotational wheel device 150 and the dichroic mirror 200 will be described. First of all, referring to FIG. 5, a case will be described in which light in the blue wavelength range, which is excitation light, is emitted from the rotational wheel device 150. Here, a position on the rotational wheel 151 on which lights in the blue wavelength range (lights L1 indicated by a solid line in FIG. 5) are incident will be referred to as a shining spot SP (also refer to FIG. 4). In FIG. 5, the reflection area 156 of the rotational wheel 151 is positioned at the shining point SP.

Lights in the blue wavelength range (excitation lights) emitted from the blue laser diodes 71 are reflected by the reflection mirror group 75 and are then emitted towards the rotational wheel device 150 and the dichroic mirror 200 by way of the excitation light path side collective lens 77 and the diffusing plate 78. In the lights in the blue wavelength range which are emitted towards the rotational wheel device 150 and the dichroic mirror 200, a part thereof is incident on the front plate surface of the rotational wheel 151 at an angle of 45 degrees at the intersecting portion 200a of the dichroic mirror 200, a remaining part passes through the dichroic mirror 200 and is then incident on the front plate surface of the rotational wheel 151 at an angle of 45 degrees at the intersecting portion 200a.

When the reflection area 156 is positioned at the shining spot SP, the lights in the blue wavelength range which are incident on the rotational wheel 151 are reflected by the reflection area 156 in such a manner that directions of axes of the lights in the blue wavelength range are changed through 90 degrees so that the blue lights are reflected towards the first collective lens 148. The lights in the blue wavelength range which are incident earlier on the rotational wheel 151 than the dichroic mirror 200 are reflected towards the first collective lens 148 by the reflection area 156 and thereafter pass through the dichroic mirror 200 so as to be guided towards the first collective lens 148. The lights in the blue wavelength range which are guided towards the first collective lens 148 are incident on the first collective lens 148 in such a manner that their light axes pass through a substantially central position of a lens surface of the first collective lens 148.

In the case that a part of the lights in the blue wavelength range which are emitted towards the rotational wheel device 150 and the dichroic mirror 200 enters the slit S1 in the dichroic mirror 200, the light in the blue wavelength range which enters the slit S1 is incident on the front plate surface of the rotational wheel 151 at the angle of 45 degrees within the slit S1, and then, the direction of a light axis thereof is changed through 90 degrees by the reflection area 156 to thereby be reflected towards the first collective lens 148.

Figure 6:
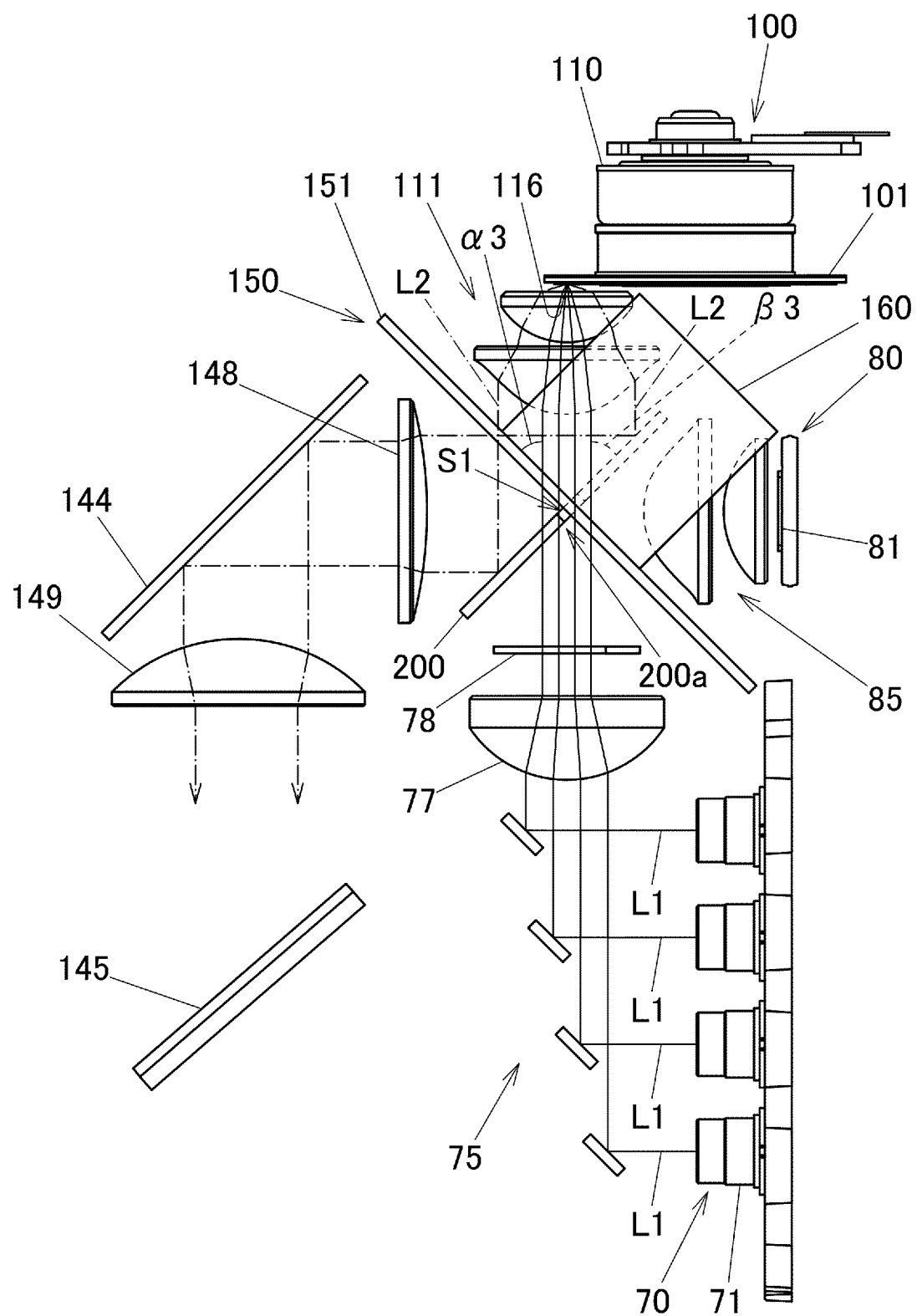
FIG. 6 is a schematic plan view showing how excitation light which is transmitted through the rotational wheel device and the dichroic mirror is shined on a luminescent light emitting area of a luminescent light emitting device and how luminescent light which is emitted from the luminescent light emitting area is reflected on the dichroic mirror in the first embodiment.

Next, referring to FIG. 6, a case will be described in which light in the green wavelength range is emitted from the dichroic mirror 200. In FIG. 6, the transmission area 154 of the rotational wheel 151 is positioned at the shining spot SP. Lights in the blue wavelength range are emitted from the blue laser diodes 71 towards the rotational wheel device 150 and the dichroic mirror 200 by way of the reflection mirror group 75, the excitation light path side collective lens 77, and the diffusing plate 78. A part of the lights in the blue wavelength range so emitted passes through the transmission area 154 of the rotational wheel 151 at the intersecting portion 200*a* of the dichroic mirror 200 and then passes through the mirror surface of the dichroic mirror 200 to thereby be emitted towards the luminescence side collective lens group 111. A remaining part of the lights in the blue wavelength range emitted from the diffusing plate 78 towards the rotational wheel device 150 and the dichroic mirror 200 passes through the intersecting portion 200*a* of the dichroic mirror 200 and then passes through the transmission area 154 of the rotational wheel 151 to thereby be emitted towards the luminescence side collective lens group 111.

In the case that a part of the lights in the blue wavelength range which are emitted towards the rotational wheel device 150 and the dichroic mirror 200 enters the slit S1 in the dichroic mirror 200, the light in the blue wavelength range which enters the slit S1 is incident on the rotational wheel 151 within the slit S1, passes through the transmission area 154, and is then emitted towards the luminescence side collective lens group 111.

The lights in the blue wavelength range which are emitted towards the luminescence side collective lens group 111 are incident on the luminescence side collective lens group 111 from a front direction and are collected by the luminescence side corrective lens group 111 to thereby irradiate the luminescent light emitting area 116 of the luminescent wheel device 100. When the lights in the blue wavelength range, which are excitation light, are shined on luminescent material particles on the luminescent light emitting area 116, luminescent lights in the green wavelength range (lights L2 indicated by alternate long and short dash lines in FIG. 6) are emitted in every direction. Here, lights emitted from the luminescent light emitting area 116 include luminescent light in the green wavelength range and excitation light which is reflected by the base 102 as it is without being shined on the luminescent material particles (hereinafter, referred to as "residual excitation light"). Light in the green wavelength range and residual excitation light which are emitted from the luminescent light emitting area 116 are refracted by the luminescence side collective lens group 111 to thereby be emitted towards the rotational wheel device 150 and the dichroic mirror 200.

In the light in the green wavelength range and the residual excitation light which are emitted towards the rotational wheel device 150 and the dichroic mirror 200, a part thereof passes through the rotational wheel 151 at the intersecting portion 220*a* of the dichroic mirror 200 and is incident on a rear plate surface of the dichroic mirror 200 at an angle of 45 degrees, while a remaining part is incident on a rear mirror surface of the dichroic mirror 200 at an angle of 45 degrees at the intersecting portion 200*a* of the dichroic mirror 200. When the transmission area 154 is positioned at the shining spot SP, in the light in the green wavelength range and the residual excitation light which are incident on the dichroic mirror 200, the light in the green wavelength range is reflected on the mirror surface of the dichroic mirror 200 in such a manner that the direction of an axis of the green light is changed through 90 degrees by the mirror surface to thereby be reflected towards the first collective lens 148, while the remaining excitation light passes through the mirror surface of the dichroic mirror 200 to thereby be removed. The light in the green wavelength range which is incident earlier on the dichroic mirror 200 than the rotational wheel 151 is reflected towards the first collective lens 148 by the mirror surface of the dichroic mirror 200 and then passes through the rotational wheel 151 to thereby be guided towards the first collective lens 148. The light in the green wavelength range which is guided towards the first collective lens 148 is incident on the first collective lens 148 in such a manner that an axis of the light in the green wavelength range passes through a substantially central position of a lens surface of the first collective lens 148.

In the case that a part of the light in the green wavelength range and the residual excitation light which are emitted towards the rotational wheel device 150 and the dichroic mirror 200 enters the slit S1 in the dichroic mirror 200, the light in the green wavelength range and the residual excitation light which enter the slit S1 pass through the transmission area 154 of the rotational wheel 151 without being incident on the mirror surface of the dichroic mirror 200 and are then emitted towards the diffusing plate 78. As a result, a gap defined between the part of the rotational wheel 151 which fits in the slit S1 and the dichroic mirror 200 is preferably made as small as possible so as to prevent light from entering the slit S1.

Figure 7:
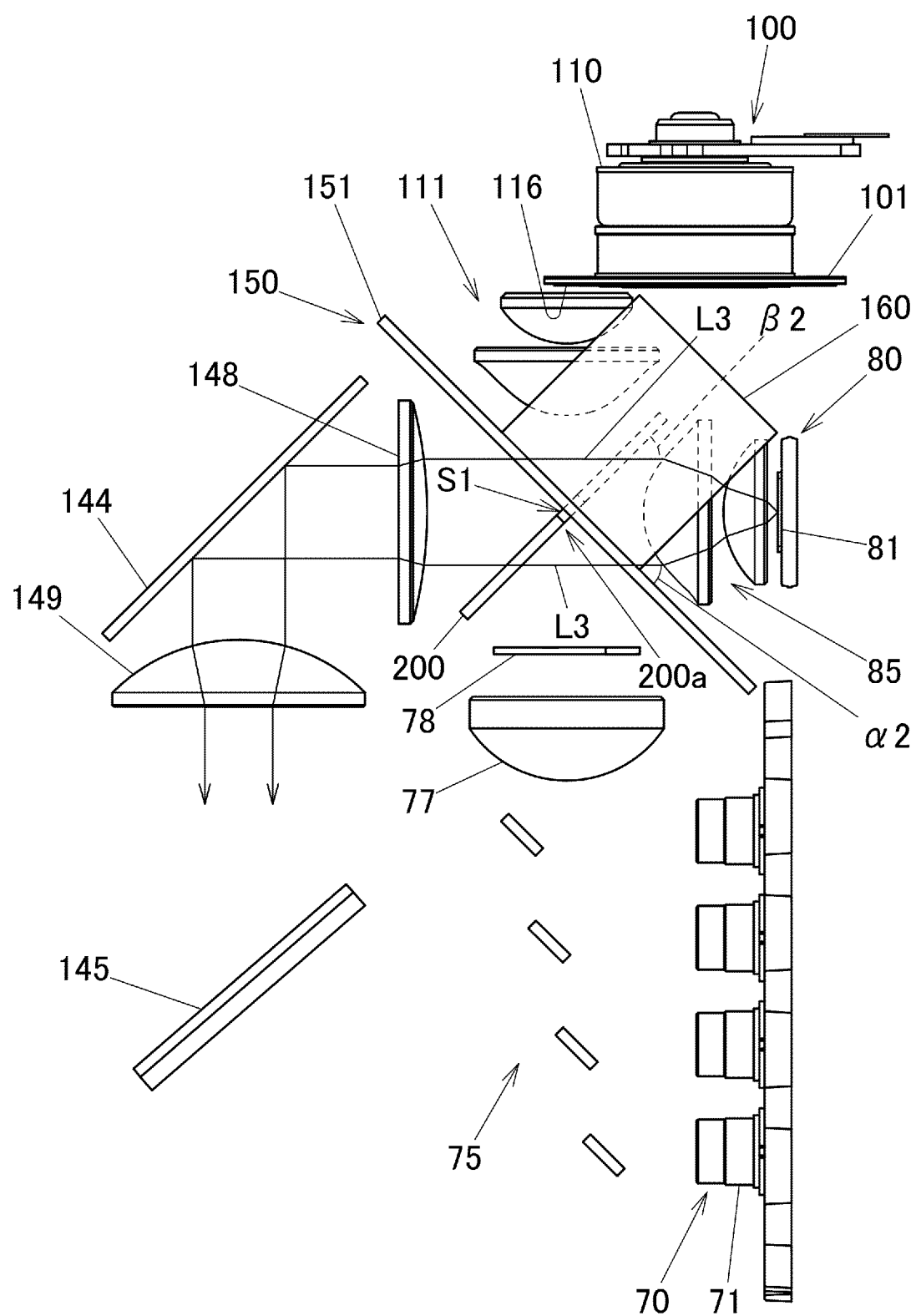
FIG. 7 is a schematic plan view showing how light in the red wavelength range which is shined on the rotational wheel device and the dichroic mirror is transmitted through the rotational wheel device and the dichroic mirror in the first embodiment.

Next, referring to FIG. 7, a case will be described in which light in the red wavelength range is emitted from the red light source device 80. In FIG. 7, the transmission area 154 of the rotational wheel 151 is positioned at the shining spot SP. Light in the red wavelength range emitted from the red light emitting diode 81 (light L3 indicated by a solid line in FIG. 7) is refracted by the red side collective lens group 85 to thereby be emitted towards the rotational wheel device 150 and the dichroic mirror 200. When the transmission area 154 is positioned at the shining spot SP, in light in the red wavelength range emitted towards the rotational wheel device 150 and the dichroic mirror 200, a part thereof passes through the transmission area 154 at the intersecting portion 200*a* of the dichroic mirror 200 and then passes through the mirror surface of the dichroic mirror 200 to thereby be guided towards the first collective lens 148, while a remaining part passes through the mirror surface of the dichroic mirror 200 at the intersecting portion 200*a* of the dichroic mirror 200 and then passes through the transmission area 154 of the rotational wheel 151 to thereby be guided towards the first collective lens 148. The light in the red wavelength range which is guided towards the first collective lens 148 is incident on the first collective lens 148 in such a manner that an axis of the red light passes through a substantially central position of a lens surface of the first collective lens 148.

Here, in the case that a part of the light in the red wavelength range which is emitted towards the rotational wheel device 150 and the dichroic mirror 200 enters the slit S1 in the dichroic mirror 200, the light in the red wavelength range which enters the slit S1 passes through the transmission area 154 of the rotational wheel 151 to thereby be emitted towards the first collective lens 148.

Light in the blue wavelength range, light in the green wavelength range, and light in the red wavelength rage which are emitted towards the first collective lens 148 in the way described above are each incident on the first collective lens 148 in such a manner that their light axes are superposed on one another. In other words, the rotational wheel device 150 and the dichroic mirror 200 are disposed in such a manner that the axis of light in the blue wavelength range which is reflected towards the first collective lens 148 by the reflection area 156 of the rotational wheel 151, the axis of light in the red wavelength range which passes through the transmission area 154 of the rotational wheel 151 to thereby be guided towards the first collective lens 148, and the axis of light in the green wavelength range which is reflected towards the first collective lens 148 by the mirror surface of the dichroic mirror 200 are superposed on one another. Light in the blue wavelength range, light in the green wavelength range, and light in the red wavelength range which are incident on the first collective lens 148 are each guided towards the light guiding optical system 180 byway of the first reflection mirror 144, the second collective lens 149, and the second reflection mirror 145.

In the present embodiment, while luminescent light in the green wavelength range is described as being emitted from the luminescent light emitting area 116 of the luminescent wheel device 100, a configuration may be adopted in which luminescent light in the yellow wavelength range is emitted from the luminescent light emitting area 116 to be incident on the dichroic mirror 200. In this case, luminescent light in the yellow wavelength range includes light in the red wavelength range and light in the green wavelength range, and in light in the yellow wavelength range which is incident on the mirror surface of the dichroic mirror 200, light in the red light wavelength range passes through the mirror surface to thereby be removed, and light in the green wavelength range is separated and is reflected by the mirror surface to thereby be emitted towards the first collective lens 148.

Here, in the present embodiment, the light source apparatus 60 capable of improving the use efficiency of the inside space of the light source apparatus 60 by suppressing an increase in the number of constituent members, and the projector 10 including the light source apparatus 60 are provided.

Thus, as has been described heretofore, the light source apparatus 60 according to the present embodiment includes the rotational wheel device 150 having the rotational wheel 151 which includes the reflection area 156 configured to reflect light in the blue wavelength range and the transmission area 154 configured to transmit light in the red wavelength range and light in the green wavelength range, and the dichroic mirror 200 configured to transmit light in the blue wavelength range and light in the red wavelength range and to reflect light in the green wavelength range. Then, the dichroic mirror 200 intersects the rotational wheel 151 in such a manner as to overlap partially and includes the intersecting portion 200a on which light in the blue wavelength range, light in the red wavelength range, and light in the green wavelength range are shined.

As a result of the light source apparatus 60 being configured as described above, a configuration can be realized in which light in the blue wavelength range, light in the red wavelength range, and light in the green wavelength range are each made to be shined on the intersecting portion from different positions, so that the lights in the blue, red, and green wavelength ranges are emitted in the same direction from the intersecting portion by adjusting the shining position of the lights in the blue, red, and green wavelength ranges. Realization of this configuration can obviate the necessity of disposing separately a lens member or the like for guiding light in the specific wavelength range independently of lights in the other wavelength ranges, thereby making it possible to suppress an increase in the number of constituent members. As a result, the utilization efficiency of the inside space of the light source apparatus 60 can be improved.

Additionally, the light source apparatus 60 includes further the excitation light shining device 70 which emits light in the blue wavelength range and which is disposed in such a manner that light in the blue wavelength range is shined on the intersecting portion 200a, the red light source device 80 which emits light in the red wavelength range and which is disposed in such a manner that light in the red wavelength range is shined on the intersecting portion 200a, and the luminescent light emitting device 100 on which light in the blue wavelength range which passes through the rotational wheel 151 is shined and which emits luminescent light including light in the green wavelength range towards the intersecting portion 200a. Then, the rotational wheel device 150 and the dichroic mirror 200 are disposed in such a manner that the axis of light in the blue wavelength range which is reflected on the reflection area 156, the axis of light in the second wavelength range which passes through the rotational wheel 151 and the dichroic mirror 200, and the axis of light in the green wavelength range which is reflected on the dichroic mirror 200 are superposed on one another. As a result of the light source apparatus 60 being configured in this way, the path of light in the blue wavelength range, the path of light in the red wavelength range, and the path of light in the green wavelength range which are emitted from the rotational wheel device 150 and the dichroic mirror 200 constitute the same path. Hence, this configuration can obviate the necessity of disposing separately a lens member or the like for guiding light in the specific wavelength range independently of lights in the other wavelength ranges. As a result, the light source apparatus 60 can be provided with a specific configuration for suppressing an increase in the number of constituent members and improving the utilization efficiency of the inside space of the light source apparatus 60.

In the light source apparatus 60, the rotational wheel device 150 is disposed in such a manner that the plate surface of the rotational wheel 151 is inclined with respect to the axes of light in the blue wavelength range, light in the red wavelength range, and light in the green wavelength range which are shined on the rotational wheel 151. In addition, the dichroic mirror 200 is disposed in such a manner that the mirror surface thereof is inclined with respect to the axes of light in the blue wavelength range, light in the red wavelength range, and light in the green wavelength range which are shined on the intersecting portion 200a. As a result, in the case that the rotational wheel device 150 and the dichroic mirror 200 are disposed in such a manner that the part of the rotational wheel 151 and the dichroic mirror 200 overlap each other, there can be provided a specific configuration for guiding light in the blue wavelength range, light in the red wavelength range, and light in the green wavelength range which are emitted from the rotational wheel device 150 and the dichroic mirror 200 in the same direction.

In the light source apparatus 60, the angle formed by the plate surface of the rotational wheel 151 and the axes of light in the blue wavelength range, light in the red wavelength range, and light in the green wavelength range which are shined on the rotational wheel 151 is 45 degrees, and the angle formed by the mirror surface of the dichroic mirror 200 and the axes of light in the blue wavelength range, light in the red wavelength range, and light in the green wavelength range which are shined on the intersecting portion 200a is 45 degrees. As a result, in the case that the rotational wheel device 150 and the dichroic mirror 200 are disposed in such a manner that the part of the rotational wheel 151 intersects the dichroic mirror 200 so as to overlap it, there can be provided a specific configuration for realizing the superposition of the axis of light in the blue wavelength range, the axis of light in the red wavelength range, and the axis of light in the green wavelength range which are emitted from the rotational wheel device 150 and the dichroic mirror 200.

The light source apparatus 60 includes the dichroic mirror 200 including the slit S1 provided therein at the intersecting portion 200a as the mirror member. Then, when the part of the rotational wheel 151 enters the slit S1, the part of the rotational wheel 151 and the dichroic mirror 200 intersect each other. As a result, there can be provided a specific configuration in which the dichroic mirror 200 is disposed in such a manner as to intersect the part of the rotational wheel 151 while overlapping it.

In the light source apparatus 60, the slit S1 is provided in such a manner to define the small gap enabling the part of the rotational wheel 151 and the dichroic mirror 200 to be disposed close to each other. As a result, the occurrence of a light leakage can be prevented in which light emerges from the gap defined between an circumferential edge of the rotational wheel 151 and the dichroic mirror 200 in the slit S1 without being incident on either of the rotational wheel 151 and the dichroic mirror 200.

In the light source apparatus 60, the rotational wheel device 150 and the dichroic mirror 200 are disposed in such a manner that the plate surface of the rotational wheel 151 and the mirror surface of the dichroic mirror 200 intersect each other at the intersecting portion 200a. As a result, light is allowed to be incident on the intersecting portion 200a in every direction from the circumference thereof in such a manner that the angles formed by the axes of lights in the blue, red, and green wavelength ranges which are shined on the intersecting portion 200a and the plate surface of the rotational wheel 151 and the mirror surface of the dichroic mirror 200 are each 45 degrees.

The light source apparatus 60 includes the luminescent wheel device 100 as the luminescent light emitting device. As a result, the concentration of heat generated from irradiation by excitation light to apart of the luminescent light emitting area 116 can be prevented.

The excitation light shining device 70 includes the blue laser diodes 71 for emitting light in the blue wavelength range and the reflection mirror group 75 for reflecting lights emitted from the blue laser diodes 71 towards the intersecting portion 200a. As a result, the blue laser diodes 71 can be disposed in an arbitrary position inside the light source apparatus 60, thereby making it possible to improve further the utilization efficiency of the inside space of the light source apparatus 60.

The light source apparatus 60 has the display device 50 on which light source light from the light source apparatus 60 is shined to thereby generate image light, the projection optical system 220 for projecting image light emitted from the display device 50 onto the projection target object such as the screen or the like, and the processor 38 for controlling the light source apparatus 60 and the display device 50. As a result, there can be provided the projector 10 which can improve the utilization efficiency of the inside space of the light source apparatus 60.

Second Embodiment

Next, referring to FIG. 8, a second embodiment of the present disclosure will be described. In describing the second embodiment, like configurations to those of the first embodiment will be omitted or simplified. A light source apparatus according to the second embodiment includes two dichroic mirrors 400A, 400B, and a form of disposition of a rotational wheel device 150 and the dichroic mirrors 400A, 400B differs from that used in the light source apparatus of the first embodiment.

Figure 8A:
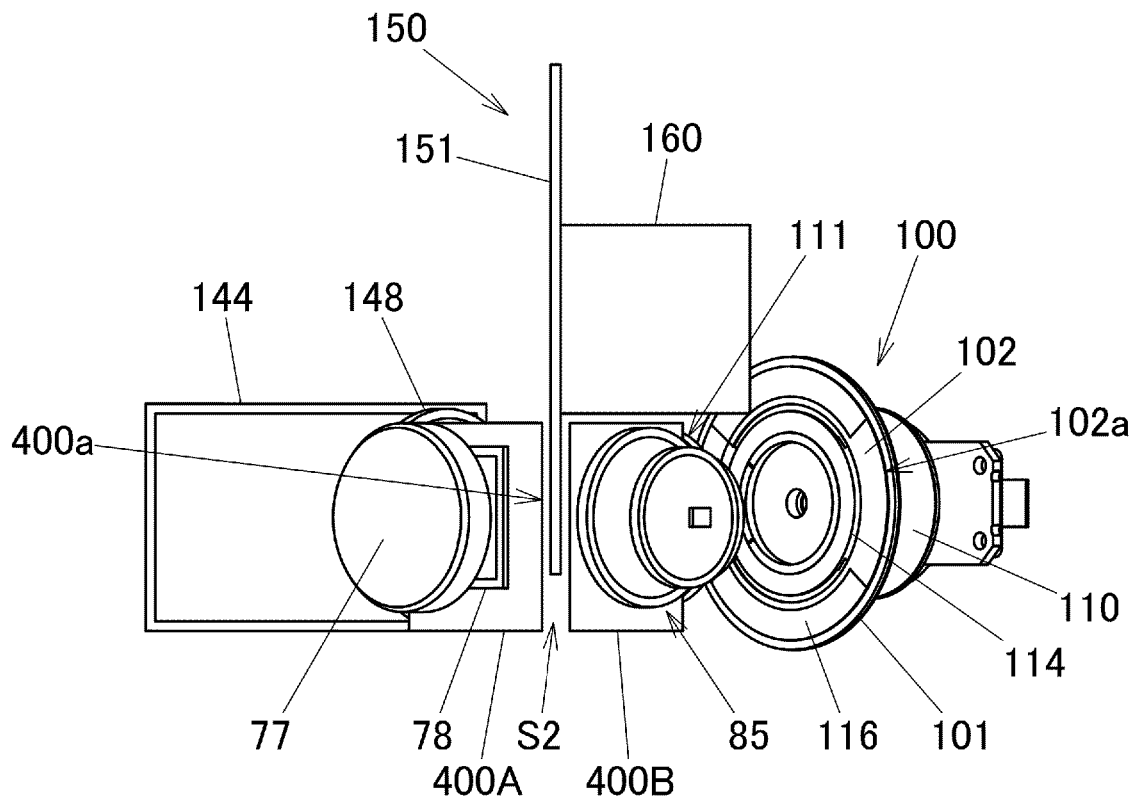
FIG. 8A is a front view showing an arrangement of members in the vicinity of a dichroic mirror in a second embodiment.
Figure 8B:
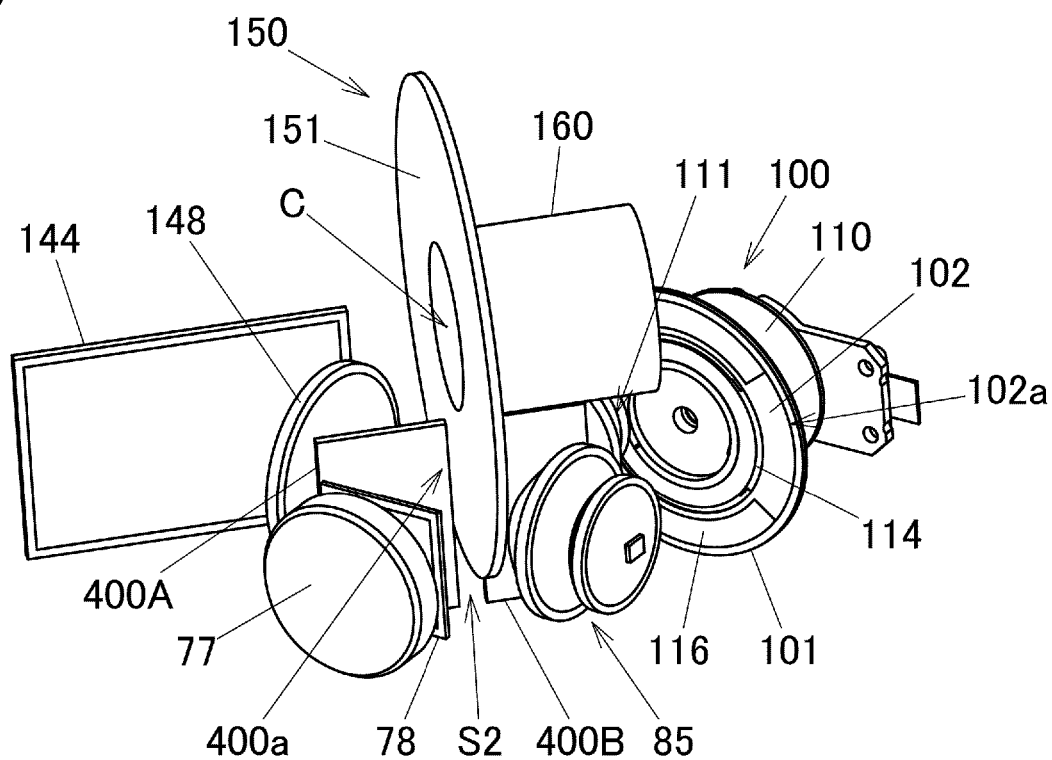
FIG. 8B is a perspective view showing the arrangement of members in the vicinity of the dichroic mirror in the second embodiment.

As shown in FIG. 8, the rotational wheel device 150 and the dichroic mirrors 400A, 400B are disposed in a position where light in the blue wavelength range emitted from a diffusing plate 78, light in the green wavelength range emitted from a luminescence side collective lens group 111, and light in the red wavelength range emitted from a red side collective lens group 85 intersect one another. The two dichroic mirrors 400A, 400B are disposed side by side with a slight gap S2 defined therebetween in such a manner that their mirror surfaces are positioned on the same plane. Then, a part of a rotational wheel 151 of the rotational wheel device 150 enters the gap S2 from above, whereby the part of the rotational wheel 151 and the dichroic mirrors 400A, 400B intersect in an overlapping fashion (hereinafter, a portion where the part of the rotational wheel 151 and the dichroic mirrors 400A, 400B interest will be referred to as an "intersecting portion 400a"). Manners in which light is transmitted through and reflected on the individual dichroic mirrors 400A, 400B are the same as the manner in which light is transmitted through and reflected on the dichroic mirror 200 of the first embodiment. In the present specification, the intersecting portion 400a includes the gap S2, and a portion of the rotational wheel 151 and portions of the individual dichroic mirrors 400A, 400B which are all situated in the vicinity of the gap S2.

The dichroic mirrors 400A, 400B are disposed in such a manner as to be inclined with respect to an axis of light in the blue wavelength range, an axis of light in the red wavelength range, and an axis of light in the green wavelength range which are shined on the dichroic mirrors 400A, 400B so that angles formed by the axes of the blue, red, and green lights and the mirror surfaces of the dichroic mirrors 400A, 400B are each 45 degrees. In addition, the rotational wheel device 150 and the dichroic mirrors 400A, 400B are disposed in such a manner that a plate surface of the rotational wheel 151 and the mirror surfaces of the dichroic mirrors 400A, 400B intersect at right angles at the intersecting portion 400a.

With the light source apparatus according to the second embodiment which is configured as has been described heretofore, too, light in the blue wavelength range which is reflected on a reflection area of the rotational wheel 151 at the intersecting portion 400a, light in the red wavelength range which is transmitted through the rotational wheel 151, and the dichroic mirrors 400A, 400B at the intersecting portion 400a, and light in the green wavelength range which is reflected on the dichroic mirrors 400A, 400B at the intersecting portion 400a are emitted towards a first collective lens 148 in such a manner that axes of the blue, red, and green lights are superposed on one another. This configuration can obviate the necessity of disposing separately a lens member or the like for guiding light in the specific wavelength range independently of lights in the other wavelength ranges, thereby making it possible not only to suppress an increase in the number of constituent members but also to improve the utilization efficiency of an inside space of the light source apparatus.

The light source apparatus according to the second embodiment includes, as a mirror member, the two dichroic mirrors 400A, 400B which are disposed in such a manner as to define the gap S2 at the intersecting portion 400a. Then, when the part of the rotational wheel 151 enters the gap S2, the part of the rotational wheel 151 intersects the dichroic mirrors 400A, 400B. As a result, there can be provided a specific configuration in which the two dichroic mirrors 400A, 400B are disposed in such a manner as to intersect the part of the rotational wheel 151 in the overlapping fashion.

In addition, with the light source apparatus according to the second embodiment, there is no need to provide a slit separately in the dichroic mirrors, thereby making it possible not only to suppress an increase in production costs in association with machining a slit but also to simplify the production process of the light source apparatus.

Third Embodiment

Figure 9:
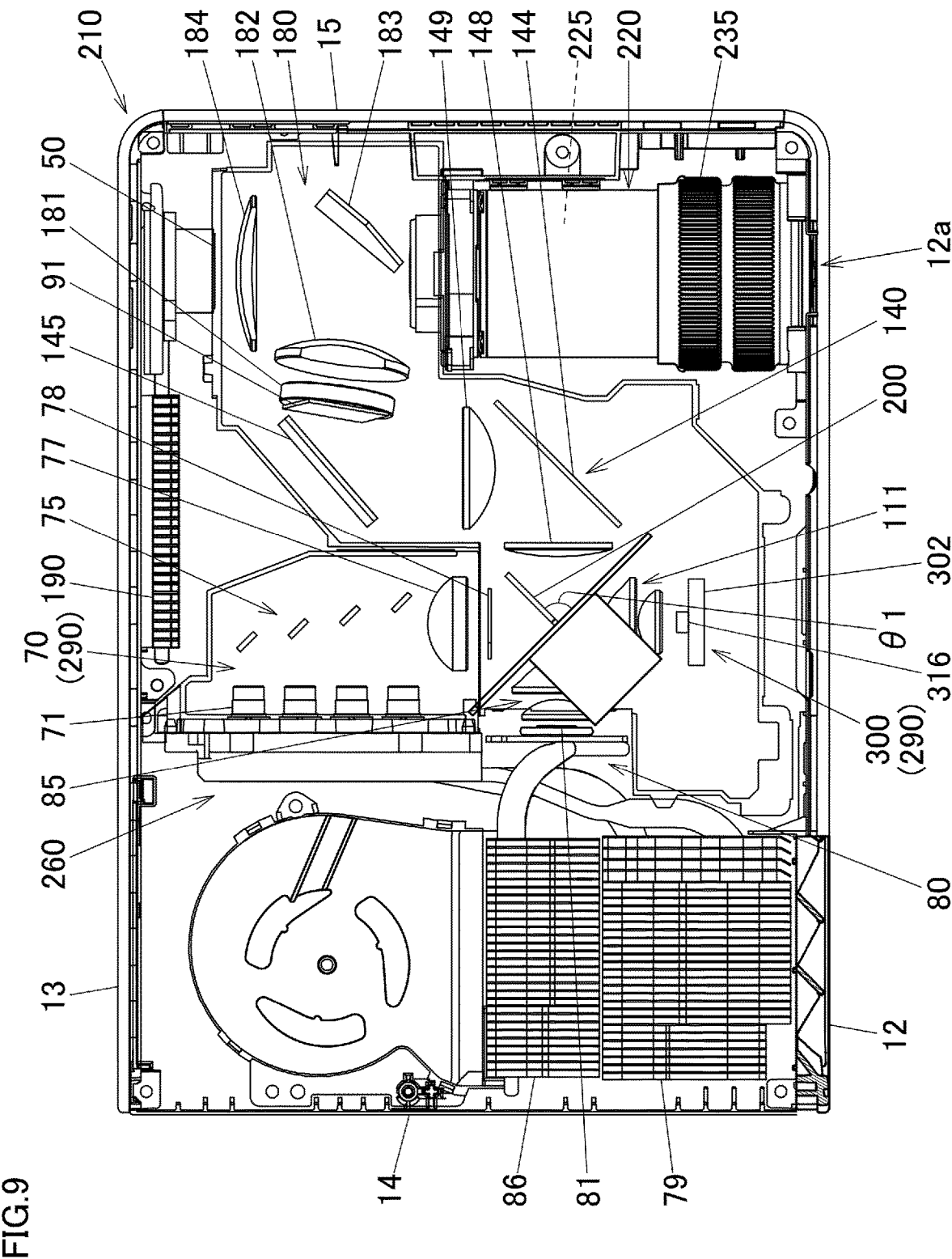
FIG. 9 is a schematic plan view showing an internal structure of a projector according to a third embodiment.

Next, referring to FIG. 9, a third embodiment of the present disclosure will be described. In describing the third embodiment, like configurations to those of the first embodiment will be omitted or simplified. A projector 210 and a light source apparatus 260 according to the third embodiment can also be applied to the second embodiment. The projector 210 and the light source apparatus 260 according to the third embodiment include a fixed luminescent body 300. A green light source device 290 is made up of an excitation light shining device 70 and the fixed luminescent body 300. The fixed luminescent body 300 is made up of a base 301, a luminescent light emitting area 316, and the like. The base 301 can be formed of a metallic material such as copper, aluminum, or the like. A flat reflection portion, which is mirror finished through silver deposition or the like, is formed on a front surface of the base 301 which faces a luminescence side collective lens group 111. The luminescent light emitting area 316 is disposed on the reflection portion on the front surface of the base 301. The configuration and light emitting manner of the luminescent light emitting area 316 are similar to those of the luminescent light emitting area 116 in the luminescent wheel device 100 of the first embodiment.

With the light source apparatus 260 according to the third embodiment, luminescent light in the green wavelength range produced and discharged in the luminescent light emitting area 316 is emitted from the fixed luminescent body 300 and is then incident on the luminescence side collective lens group 111 disposed so as to face a rotational wheel device 150 and a dichroic mirror 200. As a result, light in the blue wavelength range which is reflected on a reflection area of a rotational wheel 151, light in the red wavelength range which is transmitted through the rotational wheel 151 and the dichroic mirror 200, and light in the green wavelength range which is reflected on the dichroic mirror 200 are emitted towards a first collective lens 148 in such a manner that axes of the blue, red, and green lights are superposed on one another. As a result, with the light source apparatus 260 of the third embodiment, too, an increase in the number of constituent members can be suppressed, and the utilization efficiency of an inside space of the light source apparatus can be improved.

Additionally, with the light source apparatus 260 according to the third embodiment, since there is provided no luminescent wheel as a luminescent light emitting device, the influence of heat generated from a motor of the luminescent wheel can be prevented. As a result, heat can be dissipated with good efficiency from the excitation light shining device 70 and the fixed luminescent body 300, and a cooling fan to be provided in the light source apparatus 260 can be made smaller in size, thereby making it possible to make the light source apparatus 260 smaller in size.

The embodiments that have been described heretofore are presented as examples, and hence, there is no intention to limit the scope of the invention by the embodiments. These novel embodiments can be carried out in other various forms, and various omissions, replacements, and modifications can be made thereto without departing from the spirit of the invention. These resulting embodiments and their modifications are included in the scope and spirit of the invention and are also included in inventions claimed under claims to be made herebelow and equivalents thereof.

For example, in the individual embodiments, while the configuration is illustrated in which the rotational wheel device is disposed in such a manner as to be inclined with respect to the axis of light in the blue wavelength range, the axis of light in the red wavelength range, and the axis light in the green wavelength range which are shined on the rotational wheel so that the angles formed by the plate surface of the rotational wheel and the axes of the blue, red, and green lights are each 45 degrees, the disposition angle of the rotational wheel device is not limited to this angle. In addition, in the embodiments described above, while the configuration is illustrated in which the dichroic mirror is disposed in such a manner as to be inclined with respect to the axis of light in the blue wavelength range, the axis of light in the red wavelength range, and the axis light in the green wavelength range which are shined on the dichroic mirror so that the angles formed by the mirror surface of the dichroic mirror and the axes of the blue, red, and green lights are each 45 degrees, the disposition angle of the dichroic mirror is not limited to this angle. Further, in the embodiments described above, while the configuration is illustrated in which the plate surface of the rotational wheel and the mirror surface of the dichroic mirror are disposed in such a manner as to intersect each other at right angles, the angle at which the plate surface of the rotational wheel and the mirror surface of the dichroic mirror is not limited 90 degrees.

In addition, in the embodiments described above, while the configuration is illustrated in which the light source group of blue laser diodes is disposed in such a manner that the optical axes of the blue laser diodes become parallel to the back panel 13, the light source group of blue laser diodes may be disposed in such a manner that the optical axes of the blue laser diodes do not become parallel to the back panel 13. Further, in the embodiments described above, while the configuration is illustrated in which lights in the blue wavelength range emitted from the blue laser diodes are made to exit therefrom towards the rotational wheel device and the dichroic mirror by way of the reflection mirror group and the diffusing plate, a configuration may be adopted in which lights in the blue wavelength range emitted from the blue laser diodes are made to exit therefrom to directly reach the rotational wheel device and the dichroic mirror.

Further, in the embodiments described above, while the configuration is illustrated in which lights emitted from the red light emitting diode are made to exit therefrom towards the rotational wheel device and the dichroic mirror by way of the red side collective lens group, a configuration may be adopted in which lights in the red wavelength range emitted from the red light emitting diode are made to exit therefrom to directly reach the rotational wheel device and the dichroic mirror.

In the first embodiment and the second embodiment, while the configuration is illustrated in which the luminescent light emitting area of the luminescent wheel device has the substantially C-shape, the shape of the luminescent light emitting area is not limited thereto. For example, a configuration may be adopted in which the luminescent light emitting area has an annular shape.

What is claimed is:

1. A light source apparatus, comprising:
   a rotational wheel device having a rotational wheel comprising a reflection area configured to reflect light in a first wavelength range, and a transmission area configured to transmit at least light in a second wavelength range and light in a third wavelength range; and
   a mirror configured to transmit light in the first wavelength range and light in the second wavelength range and reflect light in the third wavelength range,
   wherein the mirror comprises an intersecting portion which intersects a part of the rotational wheel in an overlapping manner and receives light in the first wavelength range, light in the second wavelength range, and light in the third wavelength range.

2. The light source apparatus according to claim 1, comprising further:
   a first wavelength range light shining device configured to emit light in the first wavelength range and disposed in such a manner that the light in the first wavelength range is shined on the intersecting portion;
   a second wavelength range light shining device configured to emit light in the second wavelength range and disposed in such a manner that the light in the second wavelength range is shined on the intersecting portion; and
   a luminescent light emitting device configured to receive light in the first wavelength range which is transmitted through the rotational wheel and emit luminescent light including light in the third wavelength range towards the intersecting portion,
   wherein the rotational wheel device and the mirror are disposed in such a manner that an axis of light in the first wavelength range which is reflected on the reflection area, an axis of light in the second wavelength range which is transmitted through the rotational wheel device and the mirror, and an axis of light in the third wavelength range which is reflected on the mirror are superposed on one another.

3. The light source apparatus according to claim 2,
   wherein the rotational wheel device is disposed in such a manner that a plate surface of the rotational wheel is inclined with respect to axes of light in the first wavelength range, light in the second wavelength range, and light in the third wavelength range which are shined on the rotational wheel, and
   wherein the mirror is disposed in such a manner that a mirror surface of the mirror is inclined with respect to axes of light in the first wavelength range, light in the second wavelength range, and light in the third wavelength range which are shined on the intersecting portion.

4. The light source apparatus according to claim 3,
   wherein an angle that the plate surface of the rotational wheel forms with respect to axes of light in the first wavelength range, light in the second wavelength range, and light in the third wavelength range which are shined on the rotational wheel is 45 degrees, and
   wherein an angle that the mirror surface forms with respect to axes of light in the first wavelength range, light in the second wavelength range, and light in the third wavelength range which are shined on the intersecting portion is 45 degrees.

5. The light source apparatus according to claim 2,
   wherein the mirror is a dichroic mirror in which a slit is provided in the intersecting portion, and
   wherein as a result of a part of the rotational wheel entering the slit, the part of the rotational wheel and the mirror intersect each other.

6. The light source apparatus according to claim 2,
   wherein the mirror includes two dichroic mirrors which are disposed side by side with a gap provided therebetween at the intersecting portion in such a manner that mirror surfaces of the two dichroic mirrors are positioned on an identical plane, and
   wherein as a result of a part of the rotational wheel entering the gap, the part of the rotational wheel and the mirror intersect each other.

7. The light source apparatus according to claim 2,
   wherein the luminescent light emitting device is a luminescent wheel device.

8. The light source apparatus according to claim 2,
   wherein the luminescent light emitting device is a fixed luminescent body.

9. The light source apparatus according to claim 2,
   wherein the first wavelength light shining device comprises a first light source configured to emit light in the first wavelength range and a reflection member configured to reflect light in the first wavelength range emitted from the first light source towards the intersecting portion.

10. The light source apparatus according to claim 1,
    wherein the rotational wheel device is disposed in such a manner that a plate surface of the rotational wheel is inclined with respect to axes of light in the first wavelength range, light in the second wavelength range, and light in the third wavelength range which are shined on the rotational wheel, and
    wherein the mirror is disposed in such a manner that a mirror surface of the mirror is inclined with respect to axes of light in the first wavelength range, light in the second wavelength range, and light in the third wavelength range which are shined on the intersecting portion.

11. The light source apparatus according to claim 10,
    wherein an angle that the plate surface of the rotational wheel forms with respect to axes of light in the first wavelength range, light in the second wavelength range, and light in the third wavelength range which are shined on the rotational wheel is 45 degrees, and
    wherein an angle that the mirror surface forms with respect to axes of light in the first wavelength range, light in the second wavelength range, and light in the third wavelength range which are shined on the intersecting portion is 45 degrees.

12. The light source apparatus according to claim 10,
    wherein the mirror is a dichroic mirror in which a slit is provided in the intersecting portion, and
    wherein as a result of a part of the rotational wheel entering the slit, the part of the rotational wheel and the mirror intersect each other.

13. The light source apparatus according to claim 10,
wherein the mirror includes two dichroic mirrors which are disposed side by side with a gap provided therebetween at the intersecting portion in such a manner that mirror surfaces of the two dichroic mirrors are positioned on an identical plane, and
wherein as a result of a part of the rotational wheel entering the gap, the part of the rotational wheel and the mirror intersect each other.

14. The light source apparatus according to claim 1,
wherein the mirror is a dichroic mirror in which a slit is provided in the intersecting portion, and
wherein as a result of a part of the rotational wheel entering the slit, the part of the rotational wheel and the mirror intersect each other.

15. The light source apparatus according to claim 14,
wherein the slit is provided to enable the part of the rotational wheel and the dichroic mirror to disposed close to each other.

16. The light source apparatus according to claim 1,
wherein the mirror includes two dichroic mirrors which are disposed side by side with a gap provided therebetween at the intersecting portion in such a manner that mirror surfaces of the two dichroic mirrors are positioned on an identical plane, and
wherein as a result of a part of the rotational wheel entering the gap, the part of the rotational wheel and the mirror intersect each other.

17. The light source apparatus according to claim 16,
wherein the gap is provided to enable the part of the rotational wheel and the dichroic mirrors to disposed close to each other.

18. The light source apparatus according to claim 1,
wherein the rotational wheel device and the mirror are disposed in such a manner that a plate surface of the rotational wheel and a mirror surface of the mirror intersect each other at right angles at the intersecting portion.

19. A projector comprising:
the light source apparatus according to claim 1;
a display device configured to generate image light;
a projection optical system configured to project the image light emitted from the display device on to a projection target object; and
a processor configured to control the light source apparatus and the display device.

* * * * *